(12) United States Patent
Dorum (10) Patent No.: US 10,444,020 B2
(45) Date of Patent: Oct. 15, 2019

(54) METHOD AND APPARATUS FOR DEFINING ROAD GEOMETRY FROM PROBE DATA (71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 388 days.

(21) Appl. No.: 14/729,681

(22) Filed: Jun. 3, 2015

(65) Prior Publication Data
US 2016/0356606 A1 Dec. 8, 2016

(51) Int. Cl.
G01C 21/26 (2006.01)
G01V 11/00 (2006.01)
G01C 21/32 (2006.01)
H04W 64/00 (2009.01)
G06F 16/29 (2019.01)

(52) U.S. Cl.
CPC ............ *G01C 21/26* (2013.01); *G01C 21/32* (2013.01); *G01V 11/002* (2013.01); *G06F 16/29* (2019.01); *H04W 64/00* (2013.01)

(58) Field of Classification Search
CPC ........ G01C 21/30; G01C 21/26; G01C 21/32; G08G 1/0112; G08G 1/0129; G01V 11/002; G06F 17/30241; H04W 64/00
See application file for complete search history.

(56) References Cited

U.S. PATENT DOCUMENTS

| | | | |
|---|---|---|---|
| 6,385,539 B1 * | 5/2002 | Wilson | G01C 21/30 340/905 |
| 6,996,507 B1 * | 2/2006 | Myr | G06F 17/5004 172/1 |
| 8,566,021 B2 | 10/2013 | Smartt | |
| 2009/0138497 A1 | 5/2009 | Zavoli et al. | |
| 2010/0082307 A1 | 4/2010 | Dorum et al. | |
| 2012/0004845 A1 | 1/2012 | Kmiecik et al. | |
| 2012/0116678 A1 * | 5/2012 | Witmer | G01C 21/32 702/5 |
| 2013/0328863 A1 | 12/2013 | Pirwani | |
| 2014/0095062 A1 | 4/2014 | Wang et al. | |
| 2014/0249716 A1 | 9/2014 | Dorum et al. | |

FOREIGN PATENT DOCUMENTS

EP 1 857 780 A2 11/2007
WO WO 2009/059766 A1 5/2009

OTHER PUBLICATIONS

Office Action for U.S. Appl. No. 14/729,733 dated Dec. 6, 2016.
(Continued)

*Primary Examiner* — Kyle R Quigley
(74) *Attorney, Agent, or Firm* — Alston & Bird LLP (57) ABSTRACT A method, apparatus and computer program product are provided in order to define the road geometry based upon a plurality of probe points. In the context of a method, a seed point is determined that is representative of one or more probe points. The method determines the seed point by determining a weighted center of mass of the one or more probe points. The method also includes determining an orientation representative of one or more probe points proximate the seed point and creating a polyline representative of the road geometry. In this regard, the method creates the polyline by extending the polyline in the orientation from the seed point.

20 Claims, 6 Drawing Sheets (56) References Cited

OTHER PUBLICATIONS

Final Office Action for U.S. Appl. No. 14/729,733 dated Jun. 16, 2017, 20 pages.
I-95 Vehicle Probe Project & National Performance Measures Research Data Set Description [online] [retrieved from the Internet Jan. 30, 2015]. Retrieved from the Internet: <URL: http://i95coalition.org/i95/Portals/0/Public_Files/uploaded/Vehicle-Probe/I95_Fact_Sheet_V11.pdf>. 3 pages.
3D City Modeling from Street-Level Data for Augmented Reality Applications [online] [retrieved Feb. 25, 2016]. Retrieved from the Internet: <URL: http://physbam.standford.edu/~aanjneya/mridul_files/papers/modeling.pdf>. 8 pages.
Hasberg, Carsten et al.; "Integrating Spline Curves in Road Constraint Object Tracking"; Proceedings of the 11th International IEEE Conference on Intelligent Transportation Systems; Beijing, China, Oct. 12-15, 2008; 6 pages.
In re: Ole Henry Dorum; U.S. Application titled Method and Apparatus for Generating Map Geometry Based on a Received Image and Probe Data; U.S. Appl. No. 14/622,026, filed Feb. 13, 2015.
Inferring Road Maps from Global Positioning System Traces—Survey and Comparative Evaluation [online] [retrieved Feb. 25, 2016]. Retrieved from the Internet: <URL: https://www.cs.uic.edu/~jakob/papers/biagioni-trr12.pdf>. 11 pages.
Integration of GPS Traces with Road Map [online] [retrieved Feb. 25, 2016]. Retrieved from the Internet: <URL: http://www.ikg.uni-hannover.de/fileadmin/ikg/staff/publications/Konferenzbeitraege_abstract_review/zhang_thiemann_sester_2010.pdf>. 6 pags.
Jin, Hang et al.; "Road Feature Extraction from High Resolution Aerial Images Upon Rural Regions Based on Multi-Resolution Image Analysis and Gabor Filters"; Remote Sensing—Advanced Techniques Platforms, Chapter 17; Jun. 13, 2012; pp. 387-414.
Jo, Kichun et al.; "Generation of a Precise Roadway Map for Autonomous Cars"; IEEE Transactions on Intelligent Transportation Systems; vol. 15, No. 3; Jun. 2014; pp. 925-937.
Extended European Search Report for corresponding European Application No. 16172985.0 dated Oct. 27, 2016, 11 pages.
Extended European Search Report for corresponding European Application No. 16172986.8 dated Nov. 10, 2016, 10 pages.
Agamennoni, G. et al., *Robust Inference of Principal Road Paths for Intelligent Transportation Systems*, IEEE Transactions on Intelligent Transportation Systems, vol. 12, No. 1 (Mar. 2011) 298-308.
Schroedl, S. et al., *Mining GPS Traces for Map Refinement, Data Mining and Knowledge Discovery*, Kluwer Academic Publishers, vol. 9, No. 1, (2004) 59-87.
Office Action for European Patent Application No. 16172985.0 dated Feb. 15, 2018, 5 pages.
Office Action for U.S. Appl. No. 14/729,733 dated Feb. 28, 2018, 19 pages.
Office Action for U.S. Appl. No. 14/729,733 dated Mar. 29, 2019.
Advisory Action for U.S. Appl. No. 14/729,733 dated Dec. 20, 2018.
Office Action for U.S. Appl. No. 14/729,733 dated Aug. 3, 2018, 21 pages.

* cited by examiner

METHOD AND APPARATUS FOR DEFINING ROAD GEOMETRY FROM PROBE DATA

TECHNOLOGICAL FIELD

An example embodiment is directed generally to the development of polylines representative of road geometry and, more particularly, to the development of polylines representative of the road geometry based upon probe data.

BACKGROUND

In order to define road geometry that may be utilized for mapping and navigational purposes, probe data may be collected from a variety of probe sources. For example, probe data that identifies the location and heading of a probe source at a particular moment in time may be provided by mobile telephones, such as smart phones, global positioning systems (GPS) that are carried by vehicles and other types of navigation systems. Several different techniques may be employed in order to create road geometry from probe data in instances in which the probe data has a relatively high density and includes relatively high frequency trajectory information.

For example, K-means trajectory clustering associates the trajectories of a cluster of seed points that are spatially close to one another and that have similar headings. However, K-means trajectory clustering generally requires probe data that has low noise and a high probe frequency which results in relatively short distances between probe points in order for the trajectory shape to approximate the road geometry. Another technique is trajectory merging in which probe trajectories are traversed and matching graph edges are merged. Trajectories that do not match existing edges create new edges in the graph. Trajectory merging also requires probe data having relatively low noise and high probe frequency such that there are relatively short distances between probe points in order for the trajectory shape to approximate the road geometry.

A kernel density estimation technique may also be utilized to create road geometry by computing an approximate kernel density estimate of trajectories of probe points or edges over an area of interest. The kernel density estimation technique applies a threshold to produce a binary image of the roads followed by the use of various methods, such as thinning, to produce road centerlines from the binary image. The kernel density estimation technique also requires high density probe data.

Another technique utilizes principal curves. Principal curves describe self-consistent curves that pass through the middle of point data. The principal curves technique may detect individual road segments that require additional logic to address intersections and to create a road network graph. The principal curves technique also requires high probe point density and uniform probe point density to produce the desired results.

As the foregoing techniques illustrate, current techniques for creating road geometry from probe data generally rely on high frequency trajectory information and high density probe data. In instances in which the probe data is sparse and/or noisy, such as in instances in which probe data is captured in a neighborhood in which traffic moves slowly and may be parked for hours at a time in a driveway or along a roadside, the foregoing techniques may be less successful in accurately generating the road geometry.

BRIEF SUMMARY

A method, apparatus and computer program product are provided in accordance with an example embodiment in order to define the road geometry based upon a plurality of probe points. In this regard, the method, apparatus and computer program product of an example embodiment may rely upon probe data that is sparse, while continuing to define the road geometry in an accurate manner. As such, the method, apparatus and computer program product of an example embodiment may be utilized to define the road geometry for various types of road configurations including those, such as the roads in a residential area, that are based upon sparse probe data.

In an example embodiment, a method is provided that includes determining a seed point representative of one or more probe points. The method determines the seed point by determining a weighted center of mass of the one or more probe points. The method also includes determining an orientation representative of one or more probe points proximate the seed point and creating a polyline representative of the road geometry. In this regard, the method creates the polyline by extending the polyline in the orientation from the seed point.

The method of an example embodiment creates the polyline so as to extend in opposite directions from the seed point, such as by extending in both the orientation from the seed point and in an opposite orientation from the seed point. The method of an example embodiment extends the polyline by extending the polyline from a first point to a second point. The second point is spaced from the first point by a predefined amount and is disposed in the orientation from the first point. The method of this example embodiment also extends the polyline by determining a weighted center or mass of one or more probe points proximate the second point and determining an orientation representative of the one or more probe points proximate the weighted center of mass of the one or more probe points proximate the second point. The method of this example embodiment further extends the polyline by repeating extension of the polyline from the weighted center of mass of the one or more probe points proximate the second point. The method of this example embodiment also includes determining if another seed point is proximate the polyline prior to repeating the extension of the polyline. In an instance in which another seed point is determined to be proximate the polyline, the method of this example embodiment incorporates the seed point into the polyline so as to replace the second point.

The method of an example embodiment determines the orientation using a principal component analysis or a least median of squares technique or based upon headings of the one or more probe points. The method of an example embodiment also includes defining a plurality of grid cells. Each grid cell includes at least one probe point. In this example embodiment, the method determines a seed point for each grid cell. The method of this example embodiment also includes determining a heading density for the one or more probe points proximate each respective seed point. In this example embodiment, the method creates the polyline by identifying the seed point from which the polyline will be initially created based upon the heading densities of the seed points.

In another example embodiment, an apparatus is provided that includes at least one processor and at least one memory including computer program code with the at least one memory and the computer program code configured to, with the processor, cause the apparatus to at least determine a seed point representative of one or more probe points. In this regard, the seed point is determined by determining a weighted center of mass of the one or more probe points. The at least one memory and the computer program code are also configured to, with the processor, cause the apparatus to determine an orientation representative of one or more probe points proximate the seed point. The at least one memory and the computer program code are further configured to, with the processor, cause the apparatus to create a polyline representative of the road geometry. In this regard, the polyline is created by extending the polyline and the orientation from the seed point.

The at least one memory and computer program code are configured to, with the processor, cause the apparatus of an example embodiment to create the polyline so as to extend in opposite directions from the seed point. In this regard, the polyline extends in both the orientation from the seed point and in an opposite orientation from the seed point. The at least one memory and the computer program code are configured to, with the processor, cause the apparatus of an example embodiment to extend the polyline by extending the polyline from a first point to a second point. The second point is spaced from the first point by a predefined amount and is disposed in the orientation from the first point. The at least one memory and the computer program code are also configured to, with the processor, cause the apparatus of this example embodiment to determine a weighted center of mass of one or more probe points proximate the second point and to determine an orientation representative of the one or more probe points proximate the weighted center of mass of the one or more probe points proximate the second point. The at least one memory and the computer program code are further configured to, with the processor, cause the apparatus of this example embodiment to repeat the extension of the polyline from the weighted center of mass of the one or more probe points proximate the second point. The at least one memory and the computer program code are further configured to, with the processor, cause the apparatus of an example embodiment to determine if another seed point is proximate the polyline prior to repeating the extension of the polyline. In an instance in which another seed point is determined to be proximate the polyline, the seed point is incorporated into the polyline so as to replace the second point.

The at least one memory and the computer program code are further configured to, with the processor, cause the apparatus of an example embodiment to determine the orientation by determining the orientation using a principal component analysis or a least median of squares technique or based upon headings of the one or more probe points. The at least one memory and the computer program code are further configured to, with the processor, cause the apparatus of an example embodiment to define a plurality of grid cells. Each grid cell includes at least one probe point. The at least one memory and the computer program code are also configured to, with the processor, cause the apparatus of this example embodiment to determine a seed point for each grid cell. The at least one memory and the computer program code are further configured to, with the processor, cause the apparatus of this example embodiment to determine a heading density for one or more probe points proximate each respective seed point. The at least one memory and the computer program code are also configured to, with the processor, cause the apparatus of this example embodiment to create the polyline by identifying the seed point from which the polyline will be initially created based upon the heading densities of the seed points.

In a further example embodiment, a computer program product is provided that includes at least one non-transitory computer-readable storage medium having computer-executable program code portions stored therein with the computer-executable program code portions including program code instructions configured to determine a seed point representative of one or more probe points. The program code instructions configured to determine the seed point include program code instructions configured to determine a weighted center of mass of the one or more probe points. The computer-executable program code portions also include program code instructions configured to determine an orientation representative of one or more probe points proximate the seed point and program code instructions configured to create a polyline representative of the road geometry. The program code instructions configured to create the polyline include program code instructions configured to extend the polyline in the orientation from the seed point.

The program code instructions configured to create the polyline may include program code instructions configured to create the polyline so as to extend in opposite directions from the seed point by extending in both the orientation from the seed point and in an opposite orientation from the seed point. The program code instructions configured to extend the polyline include, in an example embodiment, program code instructions configured to extend the polyline from a first point to the second point. The second point is spaced from the first point by a predefined amount and is disposed in the orientation from the first point. In this example embodiment, the program code instructions are also configured to extend the polyline by determining a weighted center of mass of one or more probe points proximate the second point and by determining an orientation representative of the one or more probe points proximate the weighted center of mass of the one or more probe points proximate the second point. The program code instructions configured to extend the polyline further include, in this example embodiment, program code instructions configured to repeat extension of the polyline from the weighted center of mass of the one or more probe points proximate the second point. The computer program product of this example embodiment further include the program code instructions configured to determine if another seed point is proximate the polyline prior to repeating the extension of the polyline. In an instance in which another seed point is determined to be proximate the polyline, the computer program product further includes program code instructions configured to incorporate the seed point into the polyline so as to replace the second point.

The program code instructions configured to determine the orientation may include program code instructions configured to determine the orientation using a principal component analysis or an at least median of squares technique or based upon headings of the one or more probe points. The computer program product of an example embodiment also includes program code instructions configured to define a plurality of grid cells. Each grid cell includes at least one probe point. The program code instructions configured to determine the seed point include, in this example embodiment, program code instructions configured to determine a seed point for each grid cell. The program code instructions of this example embodiment also include program code instructions configured to determine a heading density for the one or more probe points proximate each respective seed point. In this example embodiment, the program code instructions configured to create the polyline include program code instructions configured to identify the seed point from which the polyline will be initially created based upon the heading densities of the seed points.

In yet another example embodiment, an apparatus is provided that includes means for determining a seed point representative of one or more probe points. The means for determining the seed point include means for determining a weighted center of mass of the one or more probe points. The apparatus of this example embodiment also includes means for determining an orientation representative of one or more probe points proximate the seed point and means for creating a polyline representative of a road geometry. The means for creating the polyline include means for extending the polyline in the orientation from the seed point.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to create road geometry from probe data, such as for mapping and navigational purposes. The probe data may be collected by a variety of probe sources including those probe sources that provide sparse probe point data and/or probe sources that are slowly moving so as to have increased uncertainty associated with the trajectory thereof. As a result, the method, apparatus and computer program product of an example embodiment are configured to create road geometry for a variety of different types of roads including roads in a neighborhood or roads that are otherwise traveled at a relatively slow rate of speed which may otherwise be difficult to map.

Figure 1:
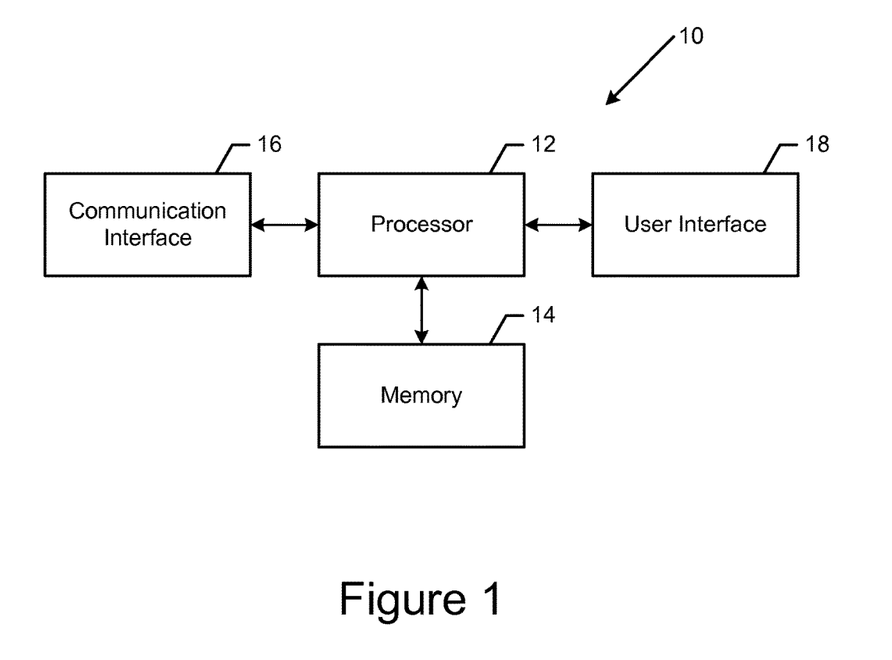
FIG. 1 is a block diagram of an apparatus that may be specifically configured in accordance with an example embodiment of the present invention.

The apparatus of an example embodiment may be embodied by a variety of computing devices. For example, the apparatus may be embodied by a server, a personal computer, a computer workstation, a laptop computer, a plurality of networked computing devices or the like. Regardless of the type of computing device that embodies the apparatus, the apparatus 10 of an example embodiment may include, may be associated with or may otherwise be in communication with a processor 12 and a memory device 14 and optionally a communication interface 16 and/or a user interface 18, as shown in FIG. 1.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

Figure 2:
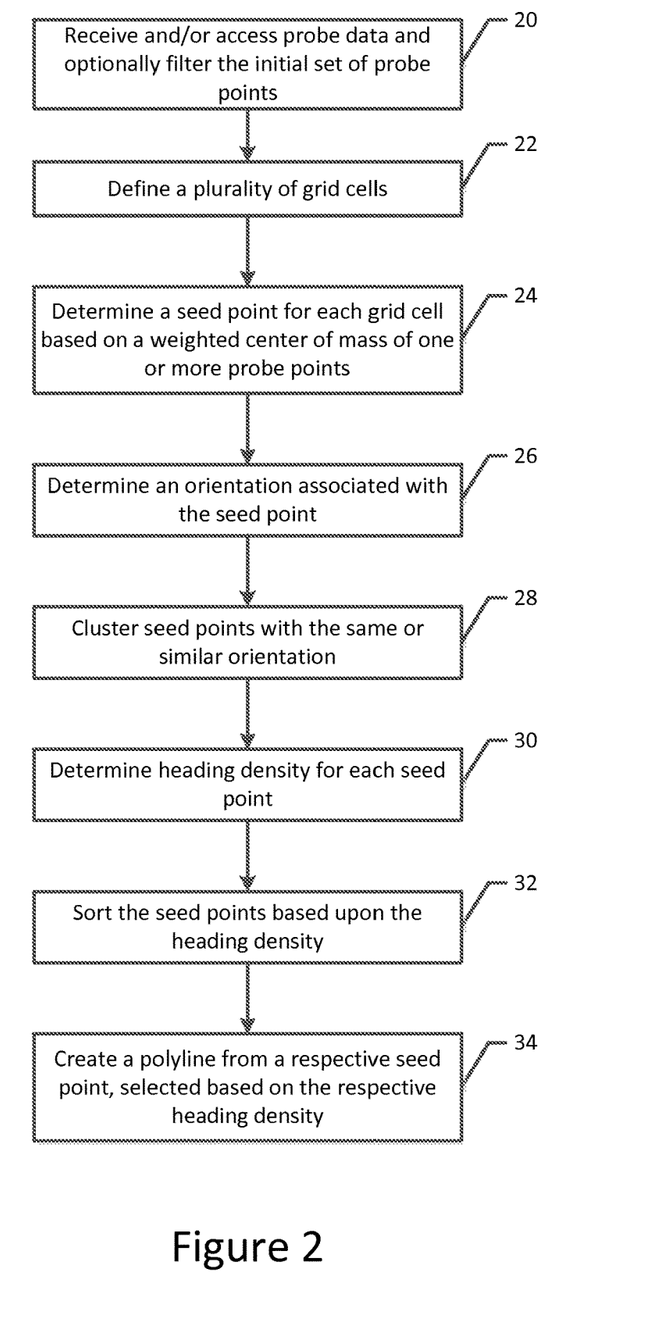
FIG. 2 is a flowchart illustrating the operations performed, such as by the apparatus of FIG. 1, in accordance with an example embodiment of the present invention.

In order to create road geometry from probe data as represented by a plurality of probe points, reference is now made to FIG. 2 in which the operations performed, such as by the apparatus 10 of FIG. 1, are depicted. In this regard, the apparatus of an example embodiment includes means, such as the processor 12, the communication interface 16 or the like, for receiving probe data and/or means, such as the processor, the memory 14, the communication, interface or the like, for accessing probe data. See block 20. The probe points generally provide an indication of the position at which the probe data was collected, the rate at which the probe source that collected the probe data was moving and the orientation or trajectory with which the probe source is moving upon collecting the probe data. The probe data may be collected by a variety of probe sources including mobile telephones, such as smart phones, GPS units, navigation systems and the like. The probe data may be provided in advance of or concurrent with the creation of the road geometry. Although all probe data may be utilized in some embodiments, the apparatus of an example embodiment includes means, such as the processor or the like, for filtering the probe data. In this regard, the processor of an example embodiment may be configured to filter out probe data that was captured by a probe source moving at less than a predefined rate, such as at a rate of less than 5 kilometers per hour, probe data that satisfies criteria associated with noisy data and/or probe data having a heading that is clearly erroneous or otherwise anomalous, such as defined by predefined criteria.

Figure 3:
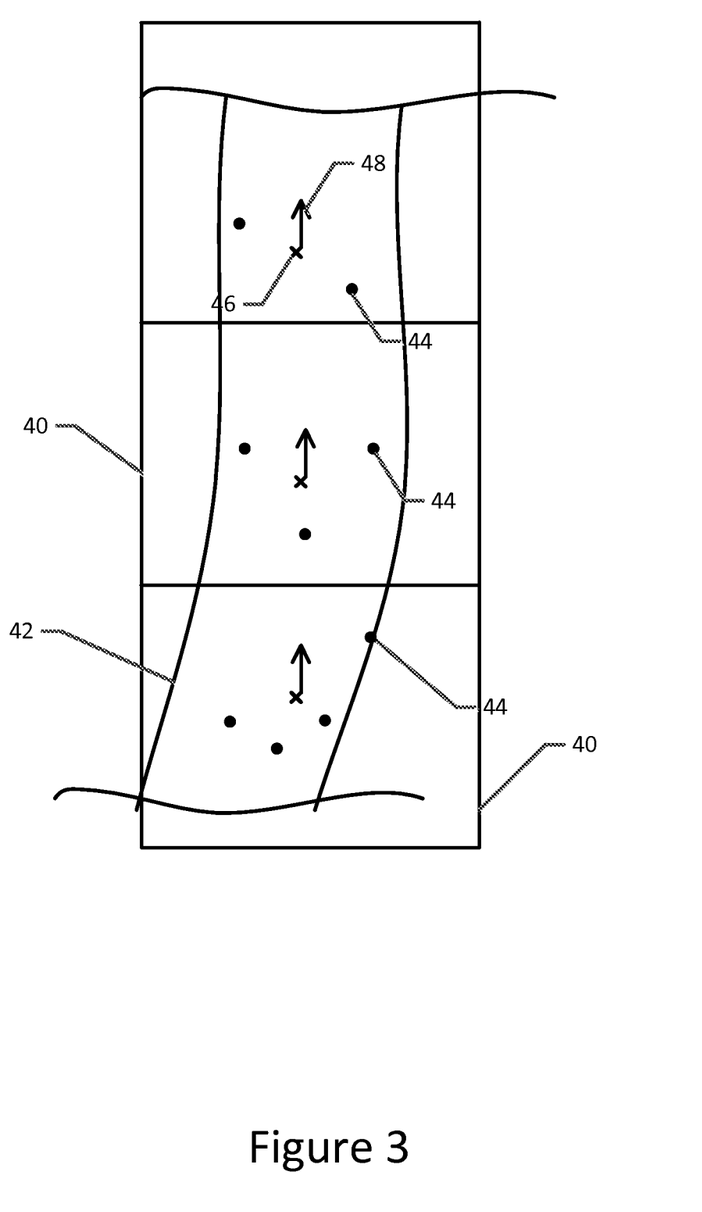
FIG. 3 depicts a plurality of grid cells, each including a plurality of probe points represented by a seed point having an orientation associated therewith in accordance with an example embodiment of the present invention.

The apparatus 10 also includes means, such as the processor 12 or the like, for determining one or more seed points representative of one or more probe points. A listing of the seed points may be maintained, such as by memory 14. In order to facilitate parallel processing of the probe data, the apparatus of an example embodiment may include means, such as the processor or the like, for defining the plurality of grid cells. See block 22 of FIG. 2. As shown in FIG. 3, each grid cell 40 may be the same size and shape, such as a square tile, for example, having a side length that is based upon the width of the road 42, such as by being a multiple of the road width, e.g., two or three times the width of the road. In an example embodiment, each grid is a square tile having a side length of 25 or 30 meters. Each grid cell includes at least one probe point 44, such as shown in FIG. 3 in which each grid cell includes a plurality of probe points.

In this example embodiment, the apparatus 10 also includes means, such as the processor 12 or the like, for determining a seed point for each grid cell. See block 24 of FIG. 2. In order to determine the seed point, the apparatus of an example embodiment includes means, such as the processor or the like, for determining a weighted center of mass of one or more probe points. In order to determine the weighted center of mass, the apparatus, such as the processor, may be configured to identify the median probe point within a respective grids cell. A predefined radius $R_{SCM}$ may be defined around the median probe point and the probe point(s) designated i=1, 2, . . . n within a circle having the radius $R_{SCM}$ about the median probe point may be identified. The radius $R_{SCM}$ may be predefined in various manners, but is two or three road widths, such as 50 meters, in some embodiments. The weighted center of mass may be determined in various manners, but, in an example embodiment is determined in an iterative fashion utilizing a mean shift technique that repeatedly determines the weighted center of mass until the weighted center of mass converges.

In this regard, the mean shift technique is a non-parametric feature-analysis technique for locating the maxima of a density function and may be mathematically represented as follows:

$$x_{(k+1)} = \mu(x_{(k)}) \text{ where}$$

$$\mu(x) = \frac{\sum_{i=0}^{n} K_H(X_i - x) X_i}{\sum_{i=0}^{n} K_H(X_i - x)}$$

is repeated until x converges where $x_i$ represents the location of probe point i in the neighborhood around x defined by radius $R_{SCM}$.

In the foregoing function, x is the location of the median probe point, e.g., in the first iteration $x_{(0)}=x$ is the starting point which is the location of the median probe point x, and $K_H(\cdot)$ is a Gaussian kernel function $$K_H(\cdot) = e^{-\frac{1}{2}\left(\frac{(X_i - x)}{h}\right)^2}$$

and h is the bandwidth. The weighted center of mass around point x may also be referenced as $\mu^x$. Although the weighting is performed using a Gaussian kernel function in the foregoing example, other kernels may be utilized in order to perform different weighting including, for example, a uniform convolution kernel, an Epanechnikov convolution kernel or a biweight convolution kernel. The interative computation of the weighted center of mass is repeated until the weighted center of mass converges, that is, until the change in location of the weighted center of mass from $x_i$ to $x_{i+1}$ is less than a predefined threshold.

In this regard, following the determination of a new location $x_{i+1}$, the probe points within the same predefined radius $R_{SCM}$ of the new location $x_{(k+1)}$ are identified. The weighted center of mass of the new set of probe points proximate the new location $x_{(k+1)}$ is identified. The change in location between the weighted center of mass of the probe points proximate the new location $x_{(k+1)}$ is then compared to the weighted center of mass of the probe points proximate the new location $x_{(k)}$. If the change in location exceeds the predefined threshold, the iterative process continues. However, if the change in location is less than the predefined threshold, the weighted center of mass is considered to have converged and the iterative process is concluded.

Once the weighted center of mass has converged, the resulting weighted center of mass is defined as the seed point for the respective grid cell 40. With reference to FIG. 3, the seed points 46 for each respective grid cell are denoted by an "X". Although the weighted center of mass is based upon the probe points within the grid cell, the weighted center of mass may, in some instances, be determined to be outside of the respective grid cell.

Following the determination of the seed point 46, the apparatus 10 includes means, such as the processor 12 or the like, for determining the orientation associated with the seed point. See block 26 of FIG. 2. The orientation may be determined in various manners including the use of a principal component analysis (PCA) or a least median square technique, as separately described below, or based upon headings of the one or more probe points. Principal component analysis is a point-based technique, while the least median square technique may be applied to points and/or probe headings. The orientation represents the heading orientation, e.g., heading vector as may be derived from the heading angle, or the point shape of the majority of the probe points located within a circle having a predefined radius $R_{PCM}$ centered about the seed point. The orientation therefore relates to the local road tangent, such as the local direction of the corresponding portion of the road as determined by PCA, and is utilized as described below in the search for additional probe points to define a road segment. By way of example, the orientation of the seed points in FIG. 3 is shown by directional arrows 48.

Principal component analysis is a dimensionality reduction technique. In an embodiment that utilizes a weighted principal component analysis to determine the orientation, the apparatus 10, such as the processor 12, is configured to determine the covariance matrix for the neighborhood of probe points around location x, such as the probe points within a predefined radius of location x, as follows:

$$\Sigma^x = (\sigma_{jk}^x) \text{ whose } (j,k) \text{ entry is } \sigma_{jk}^x = \Sigma_{i=0}^n w_i (X_{ij} - \mu_j^x)(X_{ik} - \mu_k^x)$$

In the covariance matrix defined above, $\mu^x$ is the mean (or media for robustness) location around x and the weights $w_i$ are defined as $$w_i = \frac{K_H(X_i - x)}{\sum_{i=0}^{n} K_H(X_i - x)}.$$

The first eigenvector $\Sigma_x$, that is the eigenvector for which the corresponding eigenvalue is the largest, is the first local principal component and defines the orientation of the probe points in the neighborhood of the seed point x. Other techniques for performing principal component analysis (PCA) and dimensionality reduction are also possible, such as, for example, PCA by singular value decomposition (SVD).

In another embodiment in which the apparatus 10, such as the processor 12, is configured to utilize the least median of squares technique to determine the orientation, the apparatus, such as the processor, is configured to run a plurality of trials k. For each trial k, two probe points are randomly selected to define a line $l_k$ through them. The apparatus, such as the processor, then determines the residuals $r_i$ to the line $l_k$ for each probe point i. The apparatus, such as the processor, of this example embodiment retains the point pair trial $\hat{\theta}_k$ for which the median $r_i^2$ is minimized as follows:

$$\underset{\hat{\theta}}{\text{minimize}}\ \underset{i}{\text{med}}\ r_i^2.$$

The point pair trial $\hat{\theta}_k$ for which the median $r_i^2$ is minimized then serves to define a robust estimate of the orientation or shape of the probe points in the neighborhood of the seed point. In an example embodiment, the plurality of trials k may require the consideration of every probe pair combination. However, the sample size may alternatively be defined based upon the desired probability, e.g., 95%, of selecting a good subsample. In this example embodiment and for a subsample size of n=2, that is the selection of 2 points for every trial, and based on the desired degree of robustness, that is, the fraction of outlier, e.g., up to 50%, 11 random unique subsample pair selections may be required.

In addition to the orientation, the least median of squares technique may define a scale estimate and a standard deviation of the probe points perpendicular to the orientation which indicates the local spread and noise level, respectively, of the probe points. In this regard, the scale estimate $s^0$ may be defined as follows:

$$s^0 = 1.4826 * (1.0 + 5.0/(n-p)) * \sqrt{\min(\text{med}(r_i^2))}.$$

wherein p is the number of parameters, n is the number of probe points, (1.0+5.0/(n−2)) is a finite sample correction factor and 1.4826 represents the asymptotic correction for normal errors, calculated by $1/\Phi^{-1}(0.75)=1.4826$, so as to achieve the same efficiency as a least squares in the presence of only Gaussian noise. $\Phi(x)$ denotes the standard normal cumulative distribution function which describes the probability that a real-valued random variable x with a given probability distribution, such as a normal probability distribution, will be found to have a value less than or equal to x. Thus $\Phi^{-1}(x)$ is the inverse standard normal cumulative distribution function. In addition, the standard deviation may be defined as:

$$\sigma^* = \sqrt{\frac{\sum_{i=0}^{n} w_i r_i^2}{\sum_{i=0}^{n} w_i - p}} \quad \text{where } w_i = \begin{cases} 1 & \text{if } |r_i/s^0| \le 2.5 \\ 0 & \text{otherwise} \end{cases}.$$

The apparatus 10 of an example embodiment optionally includes means, such as the processor 12 or the like, for clustering two or more seed points in order to reduce the number of seed points. See block 28 of FIG. 2. In this regard, the apparatus, such as the processor, is configured to cluster seed points having the same orientation and/or orientations that differ by no more than a predefined threshold [A&B1]. By clustering seed points, the risk of creating overlapping road geometry from seed points having similar locations and headings is reduced. The apparatus, such as the processor, may employ various clustering techniques, for example, a re-gridding of the seed points in which the grid cells for the clustered seed points are combined into a re-gridded cell with the median location and the median orientation of the seed points that have been clustered being retained for the seed point for the re-gridded cell.

The apparatus 10 of an example embodiment optionally includes means, such as the processor 12 or the like, for clustering two or more seed points in order to reduce the number of seed points. See block 28 of FIG. 2. In this regard, the apparatus, such as the processor, is configured to cluster seed points having the same orientation and/or orientations that differ by no more than a predefined threshold. By clustering seed points, the risk of creating overlapping road geometry from seed points having similar locations and headings is reduced. The apparatus, such as the processor, may employ various clustering techniques, for example, a re-gridding of the seed points in which the grid cells for the clustered seed points are combined into a re-gridded cell with the median location and the median orientation of the seed points that have been clustered being retained for the seed point for the re-gridded cell.

The apparatus 10 of an example embodiment also include means, such as the processor 12 or the like, for creating a polyline representative of the road geometry. See block 34 of FIG. 2. In this regard, the polyline is created so is to extend in the orientation, such as determined in the manner described above, from the seed point. In this regard, the apparatus, such as the processor, of an example embodiment creates the polyline so as to extend in opposite directions from the seed point by extending in both the orientation from the seed point and in opposite orientation from the seed point, that is, in an orientation 180° from the orientation associated with the seed point.

Figure 4:
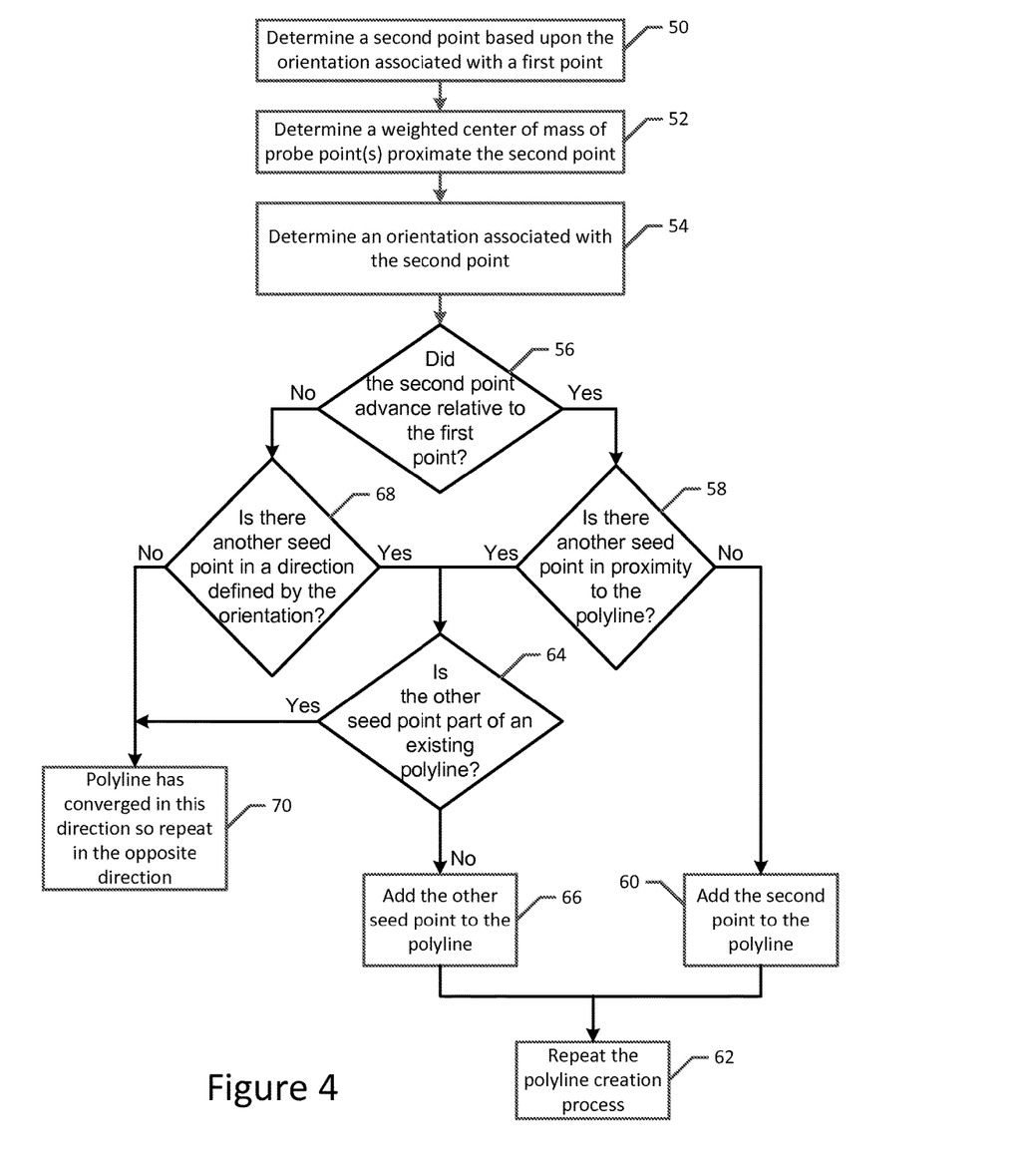
FIG. 4 is a flowchart illustrating the operations performed, such as by the apparatus of FIG. 1, in order to extend the polyline in accordance with an example embodiment of the present invention.
Figure 5:
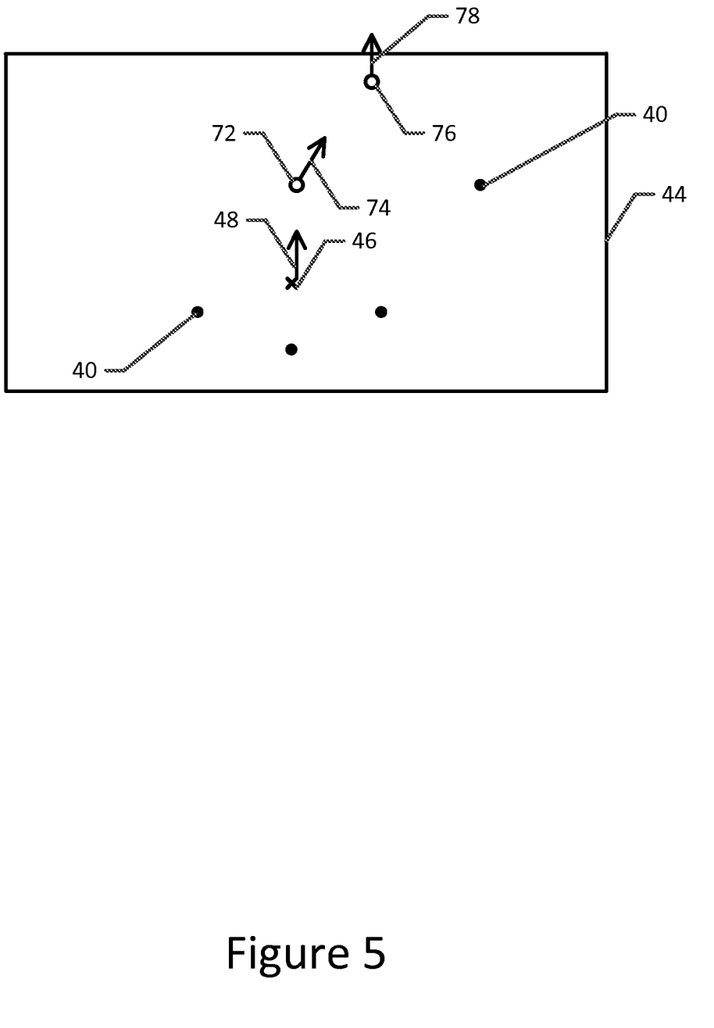
FIG. 5 illustrates the extension of the polyline in accordance with an example embodiment of the present invention.

The polyline may be created in various manners, but, in an example embodiment, the apparatus 10, such as the processor 12, is configured to create the polyline in the manner set forth by FIG. 4. In this example embodiment, the seed point defines a first point and the apparatus, such as the processor, is configured to determine a second point based upon the orientation associated with the first point, that is, the seed point. See block 50 of FIG. 4. In this regard, the second point is spaced from the first point by a predefined amount or step size s and is disposed in the orientation from the first point, that is, in the orientation associated with the seed point. In this regard, the apparatus, such as the processor, may be configured to define the second point as follows: $x_{i+1} = x_i + s\gamma^x$ wherein $\gamma^x$ defines the orientation associated with the first point. Once the second point has been defined, the apparatus includes means, such as the processor or the like, for determining the weighted center of mass of one or more probe points proximate the second point. In this regard, the apparatus, such as the processor, may be configured to determine the weighted center of mass of the probe points proximate the second point in the same manner in which the weighted center of mass of the probe points in a grid cell was initially determined. See block 52. The apparatus also includes means, such as the processor or the like, for determining the orientation representative of one or more probe points proximate the weighted center of mass of the probe points proximate the second point. See block 54. As shown in FIG. 5, for example, the weighted center of mass that is defined based upon the second point may be shown as an open circle 72 and the orientation associated therewith may be depicted by a directional arrow 74.

The apparatus 10 of an example embodiment also includes means, such as the processor 12 or the like, for determining if the weighted center of mass of the probe points proximate the second point advanced relative to the first point in the direction of the orientation associated with the first point. See block 56 of FIG. 4. In this regard, the apparatus, such as the processor, is configured to determine if the weighted center of mass has advanced since advancement does not always necessarily occur as a result of the potential sparseness of the probe data and since the mean shift technique is a gradient technique that may advance forward by a step size s and then iterate backwards to the first point. Although the advancement of the weighted center of mass may be defined in various manners, the apparatus, such as the processor, of an example embodiment may determine that the weighted center of mass has advanced based upon the satisfaction of an advancement threshold $a_{thresh}$ which, in one embodiment, is defined as:

$$\frac{(\mu^x - v) \cdot \gamma^x}{\|\gamma^x\|} \geq a_{thresh}$$

wherein $\mu^x$ is the weighted center of mass location, v is the previous vertex, e.g., the first point, and $\gamma^x$ defines the orientation of $v_i$.

In an instance in which the weighted center of mass did advance, the apparatus 10 of an example embodiment includes means, such as the processor 12 or the like, for determining whether another seed point is proximate to the polyline that extends from the first point to the second point. See block 58 of FIG. 4. For example, the apparatus, such as the processor, may be configured to determine that another seed point is in proximate to the polyline in an instance in which another seed point is located within a predefined perpendicular distance tolerance D from the polyline that extends from the first point to the second point. In an instance in which no other seed point is found to be in proximity to the polyline, the apparatus, such as the processor or the like, adds the second point to the polyline. See block 60. The foregoing process of extending the polyline may then be repeated with the second point now serving as the first point from which the polyline is to be extended during the subsequent iteration of the polyline creation process. See block 62 as well as FIG. 5 in which the polyline is subsequently extended to a third point having a respective weighted center of mass 76 and an orientation 78.

However, if another seed point is determined to be proximate the polyline that extends from the first point to the second point, the apparatus 10 of an example embodiment includes means, such as the processor 12 or the like, for determining if the other seed point is part of an existing polyline. See block 64 of FIG. 4. In an instance in which the other seed point is not part of an existing polyline, the apparatus, such as the processor or the like, is configured to add the other seed point to the polyline as a vertex instead of the second point which is discarded (thereby replacing the second point with the other seed point) to avoid an excessively crooked polyline, and the other seed point is removed from the list of seed points to be analyzed, that is, the other seed point is removed from the list that is sorted based upon heading density. See block 66. As before, the polyline creation process is then repeated with the other seed point that is determined during this iteration of the polyline creation process now serving as the first point during the subsequent iteration of the polyline creation process. See block 62. However, in an instance in which the apparatus, such as the processor, determines that the other seed point is part of an existing polyline, the apparatus, such as the processor, is then configured to determine that the polyline extending from the first point to the second point has converged in this particular direction such that further extension of the polyline in this direction is no longer desired. See block 70. Instead, the polyline creation process is repeated so as to create a polyline that extends from the respective seed point, but in the opposite orientation.

In an embodiment in which the apparatus 10, such as the processor 12, determines that the second point did not advance relative to the first point, such as by failing to satisfy the advancement threshold $a_{thresh}$, the apparatus of an example embodiment also includes means, such as the processor or the like, for determining whether another seed point is located in the direction defined by the orientation of the first point. See block 68 of FIG. 4. In addition to seed point(s) in the same direction as defined by the orientation of the first point, the apparatus, such as the processor, of an example embodiment is configured to search for other seed points in a predefined angular range centered about the direction defined by the orientation of the first point. In addition to being in the same direction or within a predefined angular range about the direction defined by the orientation of the first point, the apparatus, such as the processor, of an example embodiment is configured to only identify seed point(s) that are also within a predefined maximum look ahead distance from the first point. The predefined maximum look ahead distance of an example embodiment is larger than the step size s so as to accommodate sparse and uneven probe data, but is not generally greater than 30 to 50 meters. In this regard, the predefined maximum look ahead distance of an example embodiment is smaller than the road separation distance in an area so as to avoid the creation of polylines in an area without a road. In an instance in which another seed point does exist in the direction defined by the orientation, the apparatus, such as the processor, is configured to determine whether the other seed point is part of an existing polyline and, if so, to determine that the polyline has converged in this direction and, if not, to add the other seed point to the polyline and to then repeat the polyline creation process in the same manner as described above. However, in an instance in which the apparatus, such as the processor, determines that there is not another seed point in a direction defined by the orientation of the first point, the apparatus, such as a processor, is configured to determine that the polyline has converged in this direction and to thereafter repeat the polyline creation process, albeit in a manner so as to cause a polyline to be created that extends in the opposite orientation.

Figure 6:
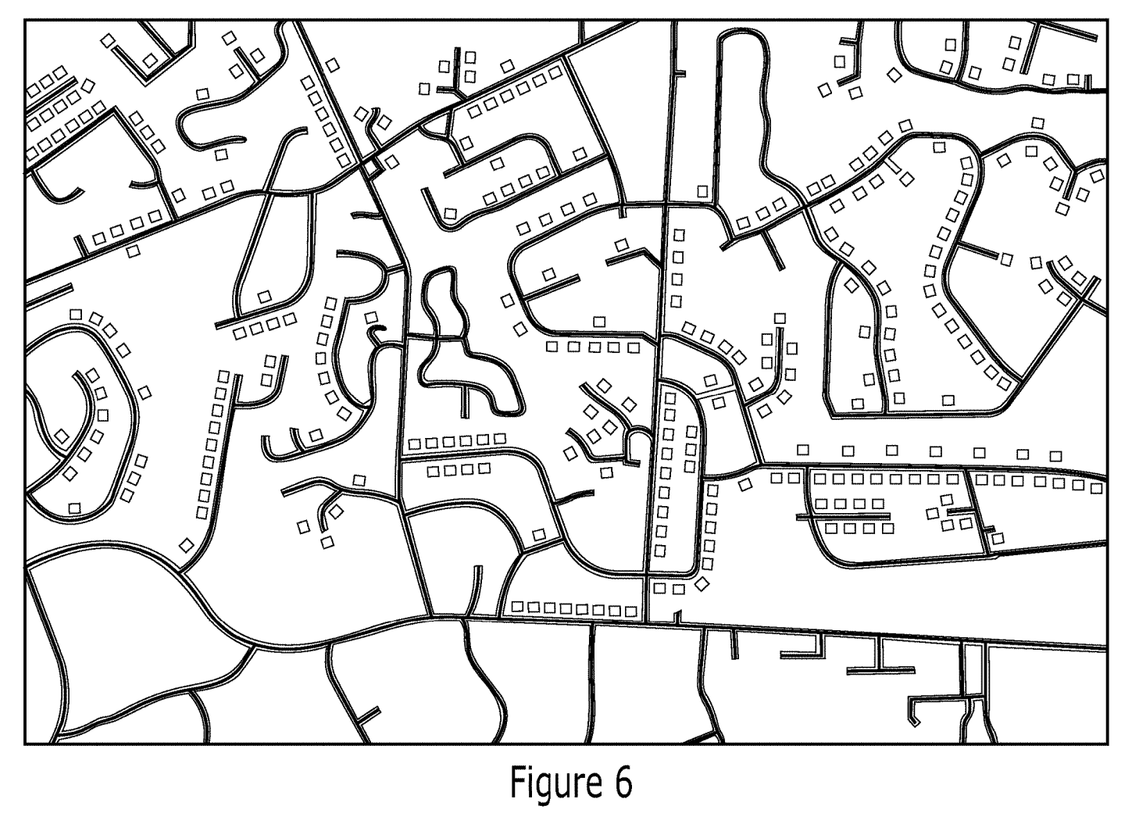
FIG. 6 is an image depicting the road geometry created in accordance with an example embodiment of the present invention.

Once a polyline has been created so as to extend from a respective seed point and, in some embodiments, in opposite directions form the respective seed point, the apparatus 10, such as the processor 12 or the like, is configured to determine if polylines have been created for all seed points and/or if all seed points have been included in a respective polyline. In an instance in which polylines have been created for all seed points and/or if all seed points have been included in a respective polyline, the polyline creation process may be terminated and the resulting network of polylines may be considered to represent the road geometry, such as shown in FIG. 6. However, if polylines have not been created for all seed points and/or if all seed points have not been included in a respective polyline, the polyline creation process, such as shown, for example, in FIG. 5, may be repeated for each respective seed point.

As described above, the method, apparatus and computer program product of an example embodiment are configured to create polylines representative of the road geometry. By repeating the foregoing polyline creation process for each seed point that is not included in the polyline creation process of another seed point and by identifying those instances in which polylines converge, a consistent set of polylines representative of the road geometry may be created, even in instances in which the probe data is sparse and/or is collected by relatively slow moving probe sources which may result in probe data having unreliable headings or trajectories associated therewith. Thus, the method, apparatus and computer program product are configured to create polylines representative of a road geometry, such as for mapping navigational purposes, for a wide variety of roads including those in the neighborhood, such as shown in FIG. 6.

FIGS. 2 and 4 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   defining a plurality of grid cells, each grid cell including at least one probe point;
   determining a seed point for a respective grid cell, wherein the seed point is representative of a first plurality of probe points, and wherein determining the seed point comprises determining a weighted center of mass of the first plurality of probe points;
   determining an orientation associated with the seed point that is based on at least one of a position or heading of a second plurality of probe points proximate the seed point;
   creating a polyline representative of a road geometry for mapping or navigation, wherein creating the polyline comprises extending the polyline by a predefined amount and in the orientation from the seed point, thereby defining a second point on the polyline that is spaced from the seed point by the predefined amount and is disposed in the orientation from the seed point;
   determining if another seed point for another respective grid cell is proximate the polyline prior to extending the polyline beyond the second point and, in an instance in which another seed point is determined to be proximate the polyline that extends from the seed point to the second point, incorporating the another seed point into the polyline as a vertex so as to replace the second point such that the polyline will then extend from the seed point to the another seed point; and
   providing the mapping or navigation using the polyline representative of the road geometry.

2. A method according to claim 1 wherein creating the polyline comprises creating the polyline so as to extend in opposite directions from the seed point by extending in both the orientation from the seed point and in an opposite orientation from the seed point.

3. A method according to claim 1 wherein extending the polyline comprises:
   determining a weighted center of mass of one or more probe points proximate the second point;
   determining an orientation representative of the one or more probe points proximate the weighted center of mass of the one or more probe points proximate the second point such that the weighted center of mass of the one or more probe points proximate the second point has a single orientation that is based on at least one of the position or the heading of each of the one or more probe points proximate the second point; and
   repeating extension of the polyline from the weighted center of mass of the one or more probe points proximate the second point.

4. A method according to claim 1 wherein determining the orientation comprises determining the orientation using a principal component analysis or a least median of squares technique or based upon headings of the second plurality of probe points.

5. A method according to claim 1 wherein determining the seed point comprises determining a seed point for each grid cell.

6. A method according to claim 5 further comprising determining a heading density for the first plurality of probe points proximate each respective seed point, wherein creating the polyline comprises identifying the seed point from which the polyline will be initially created based upon the heading densities of the seed points.

7. A method according to claim 1 wherein each grid cell has a dimension dependent upon a width of a road for which the polyline represents the road geometry.

8. An apparatus comprising at least one processor and at least one memory including computer program code, the at least one memory and computer program code configured to, with the processor, cause the apparatus to at least:
define a plurality of grid cells, each grid cell including at least one probe point;
determine a seed point for a respective grid cell, wherein the seed point is representative of a first plurality of probe points, and wherein determining the seed point comprises determining a weighted center of mass of the first plurality of probe points;
determine an orientation associated with the seed point that is based on at least one of a position or heading of a second plurality of probe points proximate the seed point;
create a polyline representative of a road geometry for mapping or navigation, wherein creating the polyline comprises extending the polyline by a predefined amount and in the orientation from the seed point, thereby defining a second point on the polyline that is spaced from the seed point by the predefined amount and is disposed in the orientation from the seed point;
determine if another seed point for another respective grid cell is proximate the polyline prior to extending the polyline beyond the second point and, in an instance in which another seed point is determined to be proximate the polyline that extends from the seed point to the second point, incorporate the another seed point into the polyline as a vertex so as to replace the second point such that the polyline will then extend from the seed point to the another seed point; and
provide the mapping or navigation using the polyline representative of the road geometry.

9. An apparatus according to claim 8 wherein the at least one memory and computer program code are configured to, with the processor, cause the apparatus to create the polyline by creating the polyline so as to extend in opposite directions from the seed point by extending in both the orientation from the seed point and in an opposite orientation from the seed point.

10. An apparatus according to claim 8 wherein the at least one memory and computer program code are configured to, with the processor, cause the apparatus to extend the polyline by:
determining a weighted center of mass of one or more probe points proximate the second point;
determining an orientation representative of the one or more probe points proximate the weighted center of mass of the one or more probe points proximate the second point such that the weighted center of mass of the one or more probe points proximate the second point has a single orientation that is based on at least one of the position or the heading of each of the one or more probe points proximate the second point; and
repeating extension of the polyline from the weighted center of mass of the one or more probe points proximate the second point.

11. An apparatus according to claim 8 wherein the at least one memory and computer program code are further configured to, with the processor, cause the apparatus to determine the orientation by determining the orientation using a principal component analysis or a least median of squares technique or based upon headings of the second plurality of probe points.

12. An apparatus according to claim 8 wherein the at least one memory and computer program code are configured to, with the processor, cause the apparatus to determine the seed point by determining a seed point for each grid cell.

13. An apparatus according to claim 12 wherein the at least one memory and computer program code are further configured to, with the processor, cause the apparatus to determine a heading density for the first plurality of probe points proximate each respective seed point, wherein the at least one memory and computer program code are configured to, with the processor, cause the apparatus to create the polyline by identifying the seed point from which the polyline will be initially created based upon the heading densities of the seed points.

14. An apparatus according to claim 8 wherein each grid cell has a dimension dependent upon a width of a road for which the polyline represents the road geometry.

15. A computer program product comprising at least one non-transitory computer-readable storage medium having computer-executable program code portions stored therein, the computer-executable program code portions comprising program code instructions configured to:
define a plurality of grid cells, each grid cell including at least one probe point;
determine a seed point for a respective grid cell, wherein the seed point is representative of a first plurality of probe points, and wherein the program code instructions configured to determine the seed point comprise program code instructions configured to determine a weighted center of mass of the first plurality of probe points;
determine an orientation associated with the seed point that is based on at least one of a position or heading of a second plurality of probe points proximate the seed point;
create a polyline representative of a road geometry for mapping or navigation, wherein the program code instructions configured to create the polyline comprise program code instructions configured to extend the polyline by a predefined amount and in the orientation from the seed point, thereby defining a second point on the polyline that is spaced from the seed point by the predefined amount and is disposed in the orientation from the seed point;
determine if another seed point for another respective grid cell is proximate the polyline prior to extending the polyline beyond the second point and, in an instance in which another seed point is determined to be proximate the polyline that extends from the seed point to the second point, incorporate the another seed point into the polyline as a vertex so as to replace the second point such that the polyline will then extend from the seed point to the another seed point; and
provide the mapping or navigation using the polyline representative of the road geometry.

16. A computer program product according to claim 15 wherein the program code instructions configured to create the polyline comprise program code instructions configured to create the polyline so as to extend in opposite directions from the seed point by extending in both the orientation from the seed point and in an opposite orientation from the seed point.

17. A computer program product according to claim 15 wherein the program code instructions configured to extend the polyline comprise program code instructions configured to:
- determine a weighted center of mass of one or more probe points proximate the second point such that the weighted center of mass of the one or more probe points proximate the second point has a single orientation that is based on at least one of the position or the heading of each of the one or more probe points proximate the second point;
- determine an orientation representative of the one or more probe points proximate the weighted center of mass of the one or more probe points proximate the second point; and
- repeat extension of the polyline from the weighted center of mass of the one or more probe points proximate the second point.

18. A computer program product according to claim 15 wherein the program code instructions configured to determine the orientation comprise program code instructions configured to determine the orientation using a principal component analysis or a least median of squares technique or based upon headings of the second plurality of probe points.

19. A computer program product according to claim 15 further comprising program code instructions configured to:
- determine a heading density for the first plurality of probe points proximate each respective seed point,
- wherein the program code instructions configured to create the polyline comprise program code instructions configured to identify the seed point from which the polyline will be initially created based upon the heading densities of the seed points.

20. A computer program product according to claim 15 wherein each grid cell has a dimension dependent upon a width of a road for which the polyline represents the road geometry, and wherein the program code instructions configured to determine the seed point comprise program code instructions configured to determine a seed point for each grid cell.

* * * * *